United States Patent [19]

Wright

[11] 4,162,435
[45] Jul. 24, 1979

[54] METHOD AND APPARATUS FOR ELECTRONICALLY COMMUTATING A DIRECT CURRENT MOTOR WITHOUT POSITION SENSORS

[75] Inventor: Floyd H. Wright, Fort Wayne, Ind.

[73] Assignee: General Electric Company, Fort Wayne, Ind.

[21] Appl. No.: 729,804

[22] Filed: Oct. 5, 1976

[51] Int. Cl.² .................. H02K 29/00; H02P 7/00
[52] U.S. Cl. ............................. 318/138; 318/254; 318/439
[58] Field of Search .................. 318/138, 254, 439

[56] References Cited

U.S. PATENT DOCUMENTS

| | | | |
|---|---|---|---|
| 3,165,685 | 1/1965 | Manteuffel et al. | 318/254 |
| 3,274,471 | 9/1966 | Moczala | 318/138 |
| 3,304,481 | 2/1967 | Saussele | 318/138 |
| 3,329,852 | 7/1967 | Saussele et al. | 318/138 |
| 3,353,076 | 11/1967 | Haines | 318/138 |
| 3,359,474 | 12/1967 | Welch et al. | 318/138 |
| 3,475,668 | 10/1969 | Mieslinger | 318/138 |
| 3,488,566 | 1/1970 | Fukuda | 318/138 |
| 3,577,053 | 4/1971 | McGee | 318/254 |
| 3,581,173 | 5/1971 | Hood et al. | 318/254 |
| 3,603,161 | 9/1971 | Schwarz | 318/254 |
| 3,603,869 | 9/1971 | Neufler et al. | 322/31 |
| 3,611,081 | 10/1971 | Watson | 318/254 |
| 3,633,084 | 1/1972 | Rakes | 318/254 |
| 3,634,873 | 1/1972 | Nishimura | 318/254 |
| 3,663,878 | 5/1972 | Miyasaka | 318/254 |
| 3,780,363 | 12/1973 | Doeman et al. | 318/254 |
| 3,783,357 | 1/1974 | Ichiyanage | 318/138 |
| 3,794,895 | 2/1974 | Coupin et al. | 318/254 |
| 3,806,785 | 4/1974 | Devalroger et al. | 318/254 |
| 3,829,749 | 8/1974 | Richt | 318/138 |
| 3,906,320 | 9/1975 | Doeman | 318/254 |
| 3,932,793 | 1/1976 | Muller | 318/138 |
| 3,938,014 | 2/1976 | Nakajima | 318/138 |
| 3,942,083 | 3/1976 | Takahashi et al. | 318/138 |
| 3,986,086 | 10/1976 | Muller | 318/138 |
| 3,997,823 | 12/1976 | Machida | 318/138 |
| 4,004,202 | 1/1977 | Davis | 318/138 |
| 4,025,835 | 5/1977 | Wada | 318/254 |
| 4,027,215 | 5/1977 | Knight et al. | 318/138 |
| 4,030,005 | 6/1977 | Doeman | 318/138 |

FOREIGN PATENT DOCUMENTS

| | | |
|---|---|---|
| 2152075 | 5/1972 | Fed. Rep. of Germany ........... 318/439 |
| 1610045 | 8/1974 | Fed. Rep. of Germany . |
| 2164685 | 5/1975 | Fed. Rep. of Germany . |
| 1374991 | 9/1964 | France . |
| 1405208 | 12/1965 | France . |
| 50-121991 | 6/1975 | Japan . |
| 7414197 | 10/1974 | Netherlands . |

*Primary Examiner*—J. V. Truhe
*Assistant Examiner*—Eugene S. Indyk
*Attorney, Agent, or Firm*—Ralph E. Krisher, Jr.; A. Burgess Lowe

[57] ABSTRACT

Method and apparatus for electronically commutating a direct current motor is disclosed not requiring position sensors but rather sampling induced voltage across an unenergized motor winding to derive control signals therefrom. One motor winding is energized while the voltage across another winding is sampled and integrated to provide a flux indication. The integrated voltage sample is compared to a reference and when that integrated value exceeds the reference, the next winding of the motor is enabled and the voltage integral returned to an initial value. A ring counter maintains an indication of the currently energized winding and may also be employed to cause the sampling circuit to sample the induced voltage on the winding next in the motor sequence to be energized.

13 Claims, 11 Drawing Figures

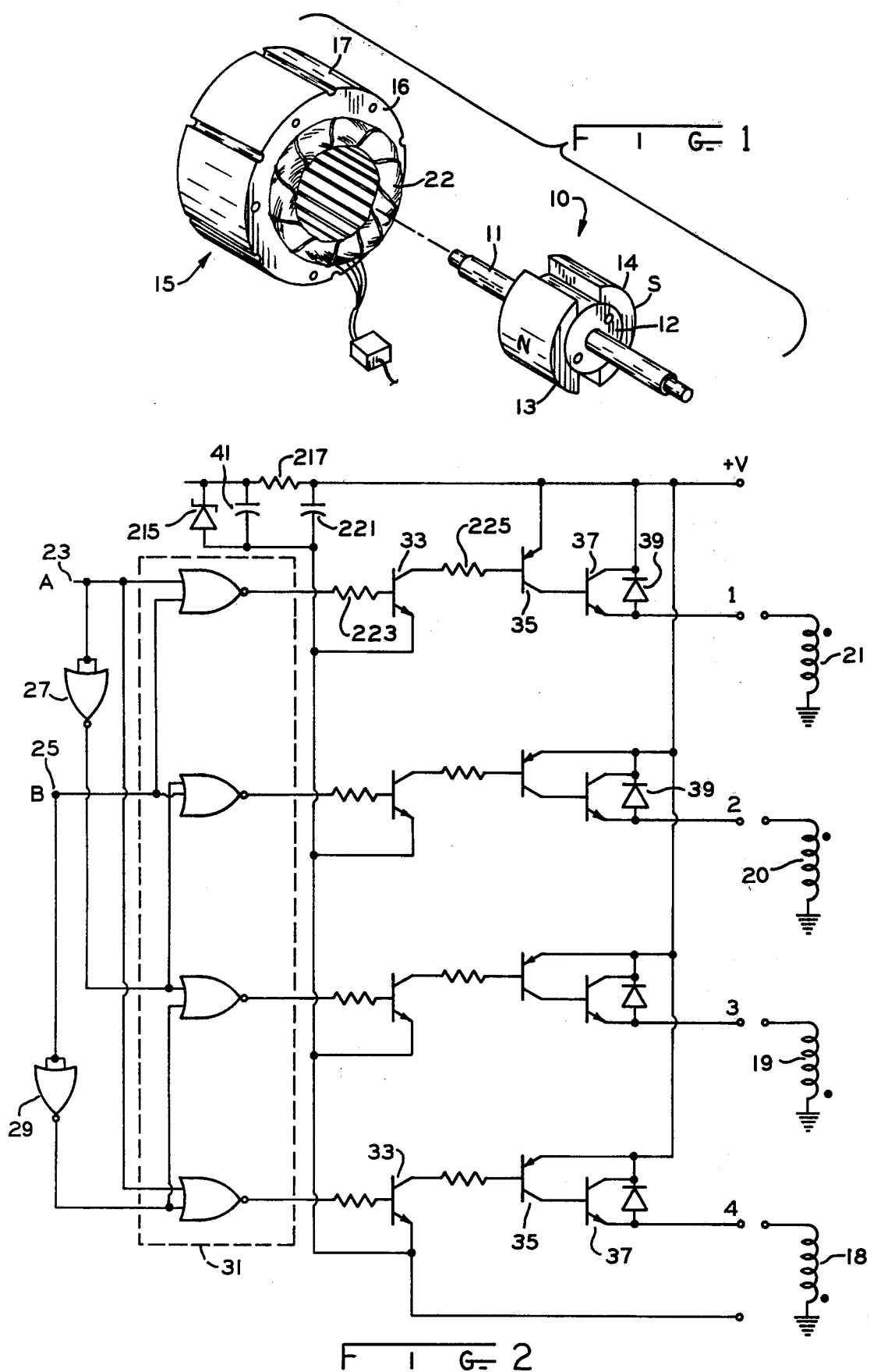

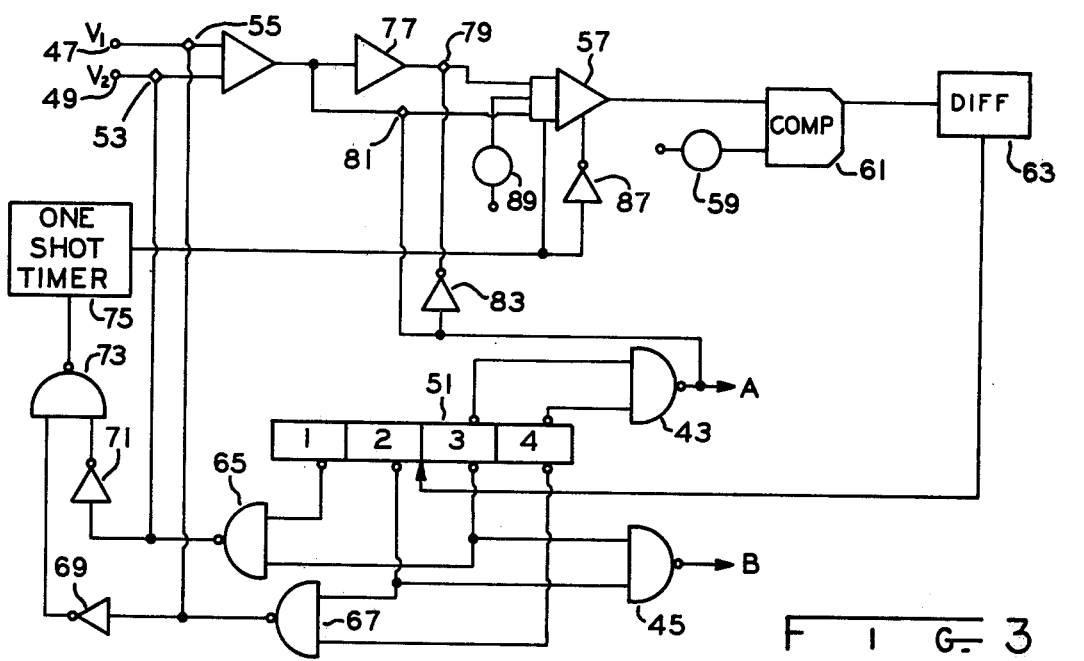
FIG. 3
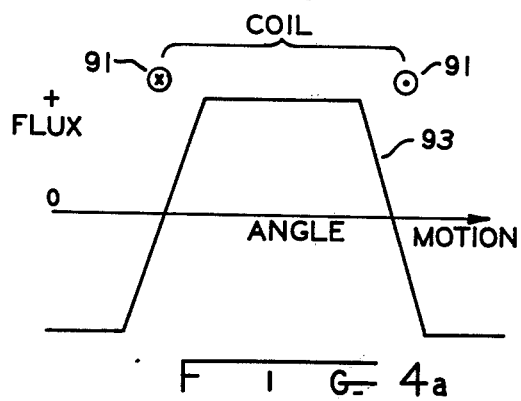
FIG. 4a
(a)
(b)
(c)
FIG. 4b
INTEGRATOR MODE CONTROL
OPTIMUM BRUSH POSITION
LAG SWITCH TOO LATE
LEAD SWITCH TOO EARLY
TIME
FIG. 5

METHOD AND APPARATUS FOR ELECTRONICALLY COMMUTATING A DIRECT CURRENT MOTOR WITHOUT POSITION SENSORS

CROSS REFERENCE TO RELATED APPLICATIONS

This application is related to the commonly assigned application of David M. Erdman, Ser. No. 729,761, now abandoned, a Continuation-In-Part of Application Serial No. 482,409 which subsequently issued as U.S. Pat. 4,005,347 and entitled "ELECTRONICALLY COMMUTATED MOTOR AND METHOD OF MAKING SAME" which Continuation-In-Part application was filed on the same day as this application. The entire disclosure of both of said Erdman applications are specifically incorporated herein by reference.

BACKGROUND OF THE INVENTION

The present invention relates generally to dynamoelectric machines and more particularly to control circuitry for such machines for energizing those machines from a direct current or rectified alternating current source.

Conventional direct current dynamoelectric machines employ brushes and segmented commutators for supplying current to rotor windings and have historically been plagued by arcing and wear problems associated with those brushes and commutators. More recently, motors for example, as disclosed in the above-mentioned U.S. Application Ser. No. 482,409 which subsequently issued as U.S. Pat. No. 4,005,347 have been devised for direct current energization employing permanent magnet rotors without brushes or segmented commutators and their attendant problems. Typically, such brushless direct current motors may employ optical or magnetic sensing arrangements to determine the rotor position and therefore also the control required for energizing their stator supported armature windings. Additional motor leads are typically required for such position sensors and the added cost in providing such position sensors is not insignificant. The aforementioned contemporaneously filed application Ser. No. 729,761 provides inter alia at least one scheme for eliminating such position sensors by deriving a signal indicative of rotor speed from a determination of the current drawn through the stator windings, e.g., total line current.

SUMMARY OF THE INVENTION

Among the several objects of the present invention may be noted the provision of an improved commutation circuit for a brushless direct current motor; the provision of method and apparatus for dispensing with mechanical rotor position sensing devices while still providing commutating signals to a brushless direct current motor; the provision of a circuit for determining rotor position of a brushless direct current motor rotor and providing commutated enabling signals to the armature of that motor without directly sensing the relative angular position of the rotor; and the provision of commutation circuitry for a brushless direct current motor which circuitry senses wave forms which reflect rotor position relative to motor enabling signals.

In general and in one form of the invention, commutating signals for a brushless direct current motor are achieved by energizing at least one armature winding and sampling the voltage induced across an unenergized winding whereafter that voltage sample is integrated and compared to a reference voltage and when the integral exceeds the reference voltage, another winding is energized and the integral returned to its initial value. A counter may be employed to identify a particular currently energized winding and that counter may further be used for sampling, for example, the voltage across the next winding in the sequence to be energized.

BRIEF DESCRIPTION OF THE DRAWING

The foregoing as well as numerous other objects, features and advantages of the present invention will become more readily apparent from the following detailed description taken in conjunction with the accompanying drawings in which:

FIG. 1 is an exploded, perspective view of the main elements of a brushless direct current motor;

FIG. 2 is a schematic diagram of circuitry for sequentially enabling the stator supported armature windings of a brushless direct current motor of the type illustrated in FIG. 1;

FIG. 3 is a schematic diagram of a wave form responsive circuit embodying features of my invention in one form thereof, and which may be substituted for the conventional position sensors to supply A and B signals to the circuit of FIG. 2;

FIG. 4a is an idealized depiction of a single armature coil in relation to the rotor flux field;

FIG. 4b illustrates current wave forms in the coil of FIG. 4a for early, preferred, and late, commutation, respectively;

FIG. 5 depicts several voltage wave forms associated with the circuit of FIG. 3, illustrating proper (preferred) and improper (not-preferred) commutation timing;

Figures 6, 7, 10:
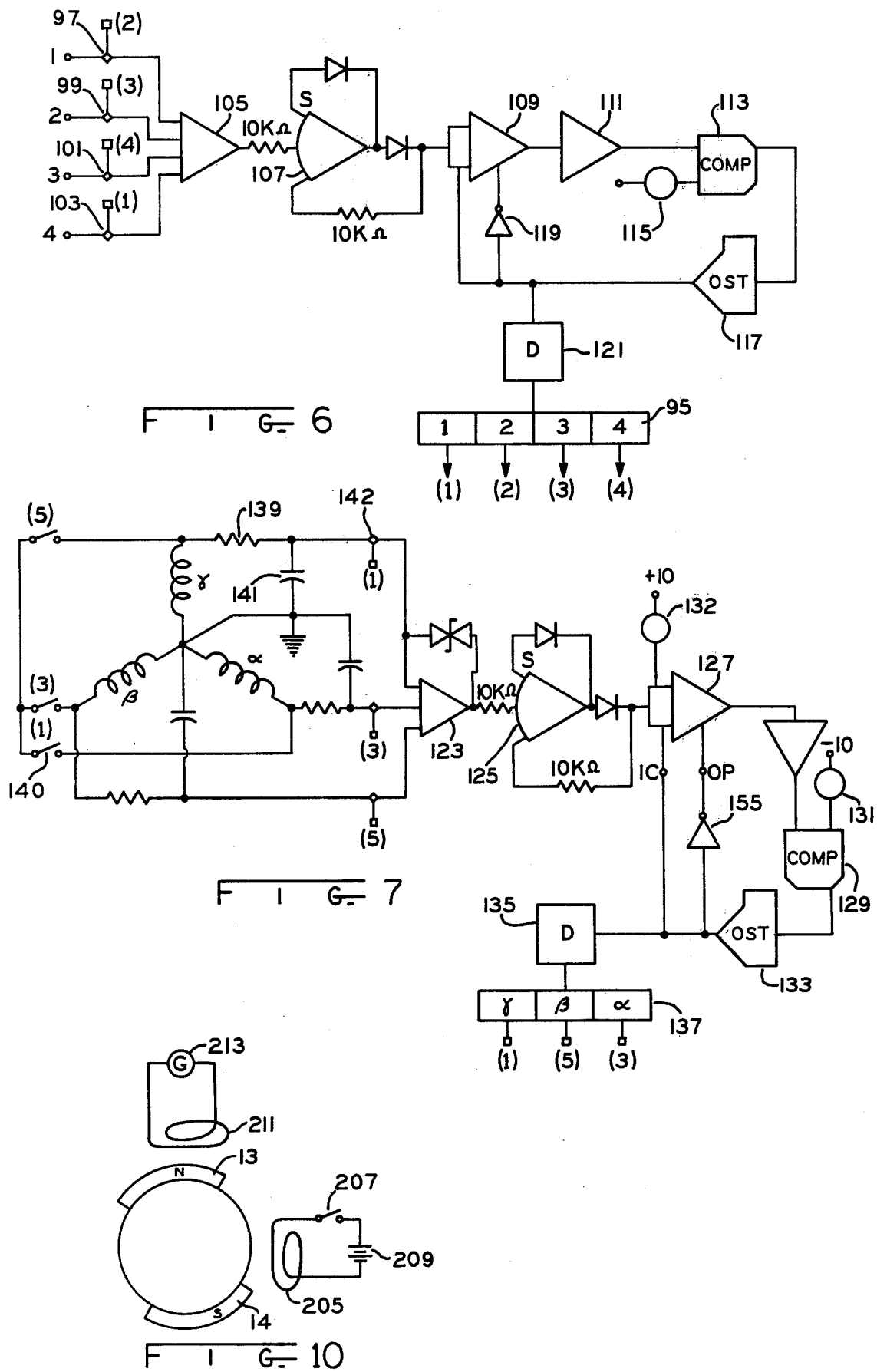
FIG. 6 illustrates in schematic form a four-phase sensorless commutating circuit.
FIG. 7 illustrates in schematic form a three-phase sensorless commutating circuit.
FIG. 10 is a simplified end view of a permanent magnet rotor and system for determining by a test pulse the position of that rotor.

The exemplifications set out herein illustrate the present invention in preferred forms thereof and such exemplifications are not to be construed as limiting the scope of the invention in any manner.

DESCRIPTION OF THE PREFERRED EMBODIMENT

Referring to FIG. 1, there is illustrated the relevant components of a brushless direct current motor of one type suitable for the practice of the present invention. A permanent magnet rotor 10 is mounted on a shaft 11 which in turn is rotatably supported by conventional bearings in a conventional housing, neither of which are illustrated in FIG. 1. The rotor 10 is magnetized across its diameter and comprises a magnetic steel core 12 and a pair of arcuate magnets 13 and 14 disposed on the periphery of the core in diametrically opposed relationship. The stationary armature assembly 15 includes a relatively low reluctance magnetic member 16 which is formed of a plurality of like stator laminations 17 assembled in juxtaposed relationship in the manner conventional in alternating current dynamoelectric machine construction. The windings 22 may be, as illustrated in FIG. 2, four separate windings 18, 19, 20 and 21 bifilarly wound in pairs to provide a distributed winding four-pole configuration.

In FIG. 2, position sensor signals are received at terminals 23 and 25 which signals may for example, be optically or magnetically derived according to the teachings of the aforementioned Ser. No. 482409 which subsequently issued as U.S. Pat. No. 4,005,347 or those signals may for example, be generated by the circuitry illustrated in FIG. 3 to be discussed subsequently. The A and B signals at terminals 23 and 25 are inverted by NOR gates 27 and 29 and these two signals along with their complements are supplied to a decoder 31 comprising four NOR gates, the output of exactly one of which is high at any given time. Transistors, such as 33, are enabled by the NOR gate high output and in turn conduction by the transistors, such as 33, enables a pair of transistors 35 and 37, connected together in a modified Darlington configuration, to supply the direct current voltage to a motor winding, such as 18. As more fully discussed in the afore-mentioned Ser. No. 482409 (now U.S. Pat. No. 4,005,347), diodes, such as 39, bleed the trapped inductive energy from the motor winding when it is disabled to be either returned to the source or stored, for example, on a capacitor such as 41. The operation of FIGS. 1 and 2 is more completely described in the afore-mentioned application Ser. No. 482409 (now U.S. Pat. No. 4,005,347) wherein the signals to terminals 23 and 25 are derived from position sensors, however, those sensors may be eliminated by following the teachings of the present invention, one form of which is illustrated, for example, in FIG. 3.

Sensor substitute signals are provided as the outputs of NAND gates 43 and 45 and the two-phase orthogonally positioned motor windings provide voltage input signals to terminals 47 and 49. A shift register 51 which is connected as a four bit ring counter identifies which of the four windings 18, 19, 20 or 21 is the currently energized winding and the voltage induced in a winding not currently energized is sampled by enabling one of the two switches 53 and 55. Frequently the winding which is sampled is the winding next in sequence to be energized. The induced voltage sample is integrated by an integrator 57 and compared to a predetermined reference voltage 59 in the comparator 61. When the level of the integral exceeds the reference voltage thereby indicating that the rotor has reached a predetermined position, the comparator output goes high and a differentiating circuit 63 which constitutes a means responsive to the comparator output, increments the shift register 51 to its next indication. Any change in the high bit position of the shift register 51 is sensed by NAND gates 65 and 67 which by way of inverters 69 and 71 and a further NAND gate 73 triggers the one-shot timer 75 to reset the integrator 57 to its initial condition or state for the next integrating cycle. An initial condition interval is also established by the one-shot timer 75 which interval is not only sufficiently long to reset the integrator 57 but further eliminates switching transients from the calculation and insures that the induced voltage due to a collapsing magnetic field from a winding being disabled is not included in the computation. Only two voltage sensing terminals 47 and 49 are employed and the voltage across only two of the four windings illustrated in FIG. 2 is sensed. To insure that the same sense or polarity of winding voltage is sensed each time, an inverter 77 along with alternately enabled switches 79 and 81 are provided. These last mentioned switches are alternately enabled by the output of NAND gate 43 and inverter 83. It should be noted that a change in rotor speed changes the time of integration but has no effect on the overall result and accordingly the integrator output is representative of rotor position or total flux change rather than rotor speed or the flux rate of change.

Wave forms associated with the circuit of FIG. 3 are illustrated in FIG. 3 with the short initial condition (IC) pulse 85 being the initial condition signal to the integrator as supplied by way of inverter 87. The output of integrator 57 is illustrated for a proper or preferred "brush position" in the second wave form whereas switching too late and switching too early respectively lead to the third and fourth integrator wave forms as illustrated. Considering the "too late" wave form, it will be noted that the integrator output will achieve its reference voltage value sooner in time than for the optimum situation in which case, of course, shift register 51 is incremented earlier, compensating for the "too late" situation. Bias input 89 to the integrator 57 is provided to sequence the switching when no counter emf is present on terminal 47 or 49, i.e., when the motor is at standstill. This bias 89 functions to make the circuit act as though the motor were running at a slow speed in the desired direction and materially aids the starting of the motor. It should also be noted that rather than creating the A and B signals as were employed in sensor type brushless motors, the outputs from shift register 51 could be employed directly for enabling winding energizing circuitry or power circuit means, such as the Darlington pair 35, 37 and the input transistor 33 for each winding as illustrated in FIG. 2, thereby eliminating the need for the decoder 31.

While the wave forms of FIG. 5 represented the integral of the voltage across a winding not at the time energized, but for example next in the sequence to be energized, the wave forms in FIG. 4b represent the current flow through an energized winding with the upper wave form thereof illustrating a heavy load or early commutation situation while the lowermost wave form illustrates a light load or late commutation situation with the intermediate wave form being the optimum "brush position" or commutation time wave form. The proper commutation time wave form corresponds to the relative positioning of an exemplary coil 91 and the rotor flux pattern 93 which is relatively uniform throughout its duration as illustrated in FIG. 4a. If the coil of FIG. 4a were located to the right of the position shown in FIG. 4a, the situation of a heavy rotor load or early energization of the coil 91, a peak in current would develop on the front edge of the conduction interval as illustrated in the upper wave form of FIG. 4b and would correspond to the integrator output illustrated in the lowermost wave form of FIG. 5.

As noted earlier, the ring counter, which as input signals are counted, has one specified "1" state which moves in an ordered sequence about a loop, may be used directly for energizing winding enabling circuitry and this is done in the circuit of FIG. 6 which illustrates a four phase or four winding motor where those windings are energized in a sequence four, three, two, one, four, three, etc. The ring counter 95 directly provides those winding enabling signals identified as (1), (2), (3) and (4) and also those signals are coupled to switches 97, 99, 101 and 103 which constitute a sampling means, in a sequence (2), (3), (4), (1) such that the next to be enabled winding voltage is sensed during a sampling interval established by the appropriately enabled switch. For example switch 101 couples winding number 3 to amplifier 105 when the fourth stage of ring counter 95 is providing the output signal (4). These sensed winding voltages are amplified by an amplifier 105 and pass through a half wave rectifier 107 which is included to prevent integrator saturation during possible large negative values of the integral. Those half wave rectified signals then pass through integrator 109, amplifier 111 and are compared in comparator 113 to a reference voltage 115 and, when the integral exceeds the reference voltage, one-shot timer 117 which constitutes a means responsive to the comparator output functions by way of inverter 119 to reset the integrator and, by way of differentiating circuit 121, to increment the ring counter 95.

Figure 8:
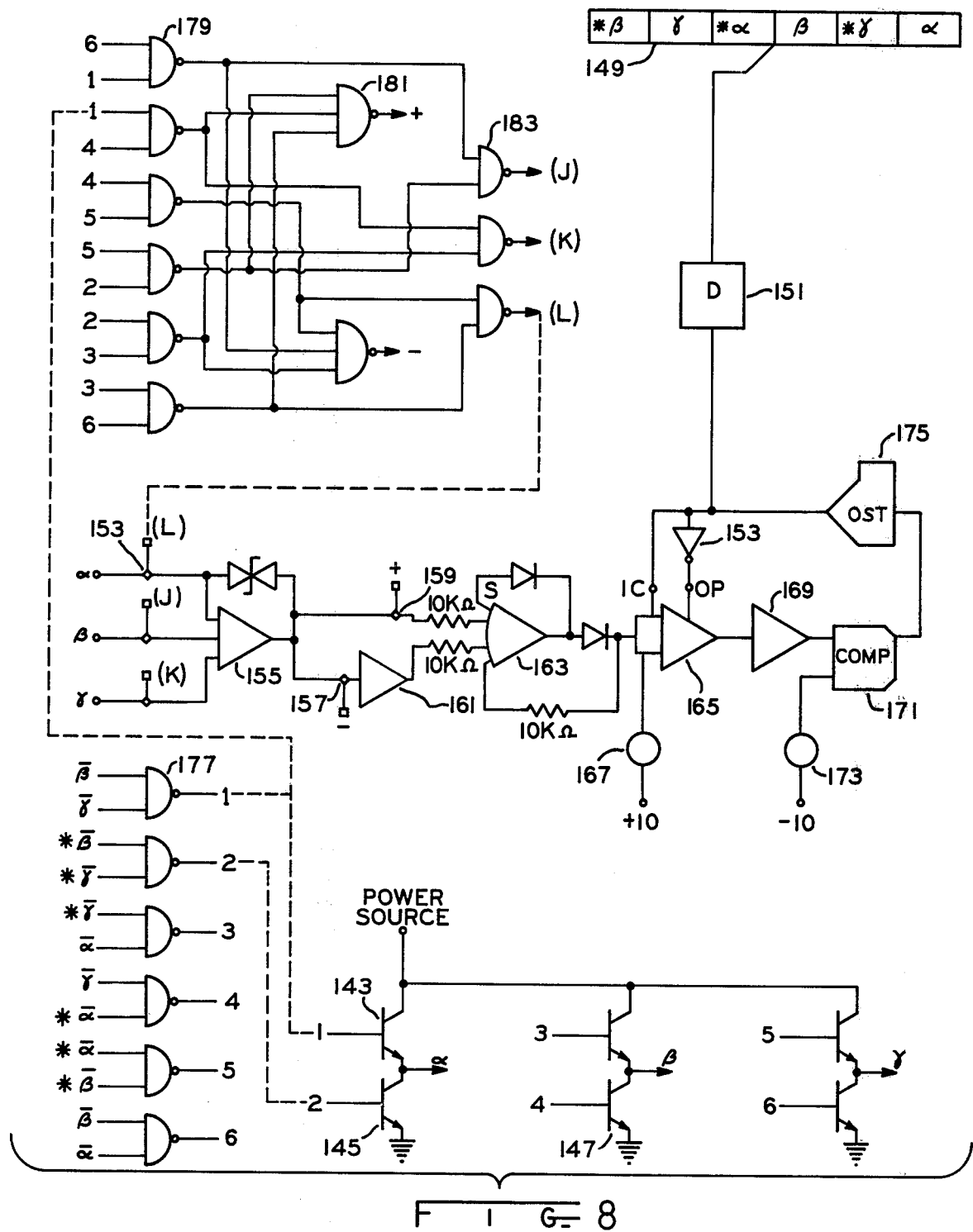
FIG. 8 illustrates in schematic form a more sophisticated and more efficient three-phase sensorless commutating circuit.

FIG. 7 illustrates the application of these same principles to a three-phase (grounded neutral) circuit with corresponding parenthetical numbers indicating outputs from ring counter 137 and enabling inputs to sensing switches such as 142 and winding enabling or power switches such as 140. As illustrated in FIG. 7, amplifier 123, half wave rectifier 125, integrator 127, comparator 129, comparator bias 131 and integrator bias 132 for motor starting purposes, one-shot timer 133, differentiating circuit 135 and ring counter 137 perform substantially as described previously in discussing FIGS. 3 and 6. With three windings only three power switches such as 140 are required and no logic circuitry is necessary to control those windings, however, each phase is filtered by resistors, such as 139, and capacitors, such as 141, which for example have a 0.1 millisecond time constant and function to reduce the transients present during the switching interval. In the circuit of FIG. 7, each winding is energized about one-third of the time, and in the circuit of FIG. 6, each winding is energized about one-fourth of the time, however, more sophisticated circuitry, such as illustrated in FIG. 8, may be employed to energize each winding of a three phase motor arrangement two-thirds of the time. A system such as illustrated in FIG. 8 has the advantage that each winding in the motor is used or energized two-thirds of the time, thus providing a motor of more efficiency for a given size as compared to the system of FIG. 7.

In the system of FIG. 8, six power switches or transistors such as 143, 145 and 147 are used since with no grounding of the neutral connection, the Y connected three windings will have two of those windings carrying current at any given time. Thus, for example, when current is flowing into the alpha winding and out of the beta winding, transistors 143 and 147 will be simultaneously energized. The circuit of FIG. 8 again employs a ring counter 149, this time of six stages, which is incremented by a differentiating circuit 151. The alpha, beta and gamma windings are sequentially sampled (the winding not then carrying current) by sequential enablement of switches such as 153 which sampled voltage is amplified by amplifier 155 and since as in the case of the FIG. 3 circuit, two polarities of sensed voltage may be encountered, this sensed voltage is passed by one of the switches 157 or 159, optionally by way of inverter 161 to a further amplifier 163. Amplifier 163 may function like the previously discussed half wave rectifier and provides an output signal to integrating circuit 165 which has a bias or starting voltage applied thereto at 167 and that integrator output is supplied by way of amplifier 169 to the comparator 171 which, when the integrating circuit voltage exceeds the reference voltage supplied by source 173, causes one-shot timer 175 to reset the integrator 165 and also the ring counter by way of differentiating circuit 151. Noting that an asterisk before a winding identifying symbol indicates current flow through that same winding in an opposite direction to the un-asterisked indication, the six bit positions of the ring counter are coupled inverted in the manner indicated to the inputs of the several NAND gates such as 177 and those NAND gate outputs 1, 2, 3, 4, 5 and 6 enable correspondingly identified transistors such as 143. The outputs of NAND gates such as 177 are also coupled to the correspondingly numbered inputs of NAND gates such as 179, the outputs of which are decoded and, for example NAND gate 181 controls switch 159, whereas NAND gate 183 controls switch 153. The other similarly positioned NAND gates control correspondingly identified switches. Thus, in the circuits of FIG. 8, higher utilization of the windings is achieved at the cost of additional logic circuitry.

An electronically commutated motor operating without position sensors functions much like an induction motor and induction motors function more efficiently with an applied sinusoidal voltage wave form. An approximation to such a sinusoidal wave form employing direct current switching circuitry of the type so far discussed is illustrated in FIG. 9a. To obtain the wave form of FIG. 9a, the energy content of which is somewhat sinusoidal, the illustrated 360° time period is divided into eight subintervals of 45° each. During the first subinterval, no current is supplied to a winding. During the second subinterval, current is supplied to a winding. However, that current is periodically interrupted by a chopper 185 of FIG. 9, which has a free running repetition rate several times that of the repetition rate of the one 360° illustrated cycle. During the third of the eight subintervals, the chopper is ineffective and current flows to the windings during the entire portion of this subinterval. The remaining 225° are subdivided into five intervals which are respectively chopped, full off, chopped but in the negative sense, full on in the negative sense, and chopped in the negative sense respectively. The wave form illustrated in FIG. 9a has the third and fifth harmonic content of the corresponding rectangular wave form suppressed and energywise approximates a sinusoidal wave form and the principles thereof may be implemented in any of the foregoing sensorless control circuits with one commutating circuit employing this feature being illustrated in FIG. 9.

Figure 9:
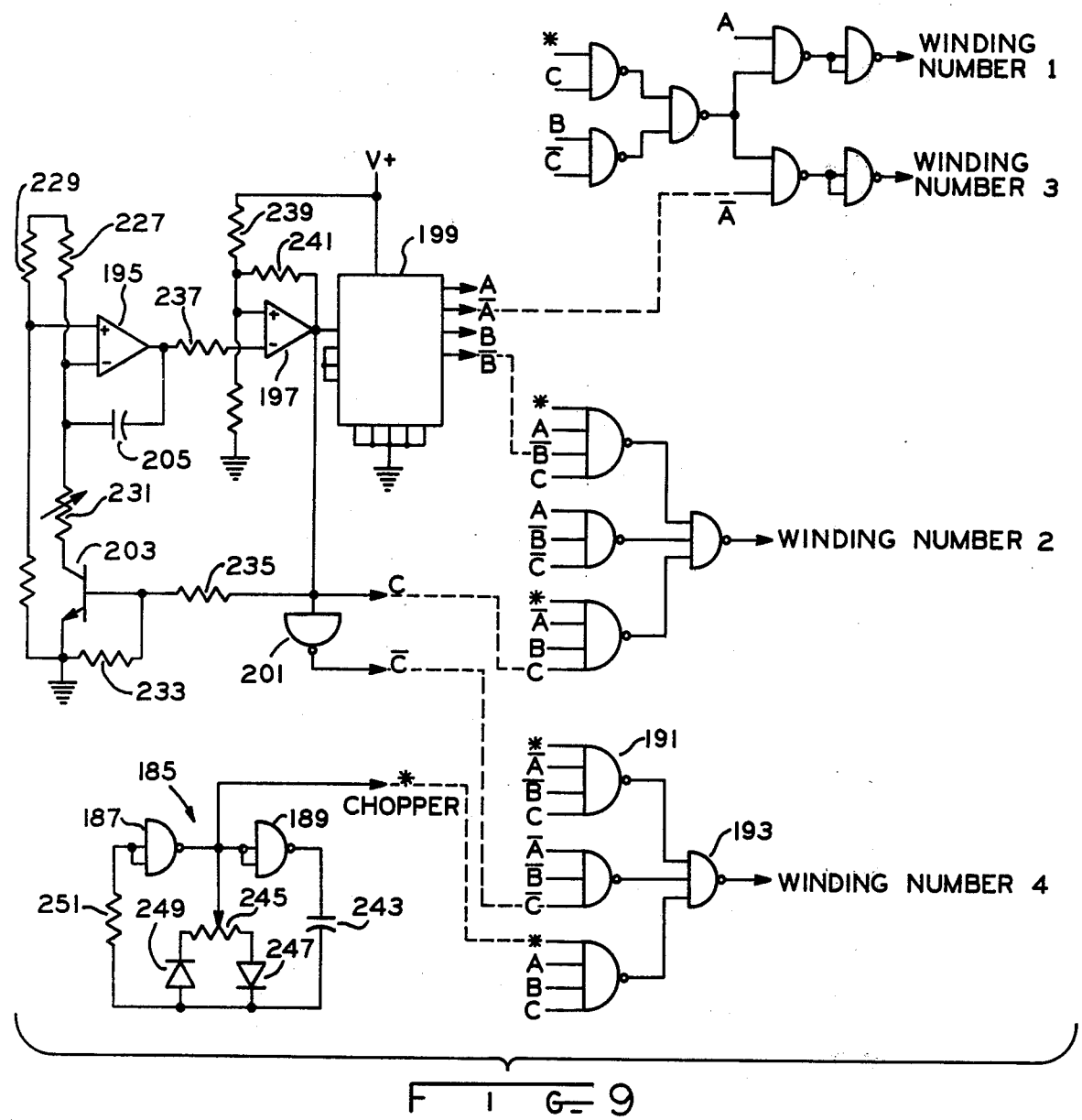
FIG. 9 is a schematic diagram of a circuit for inverting a DC voltage to produce a nearly approximate sinusoidal wave form which can be used to energize an induction motor.
Figure 9A:
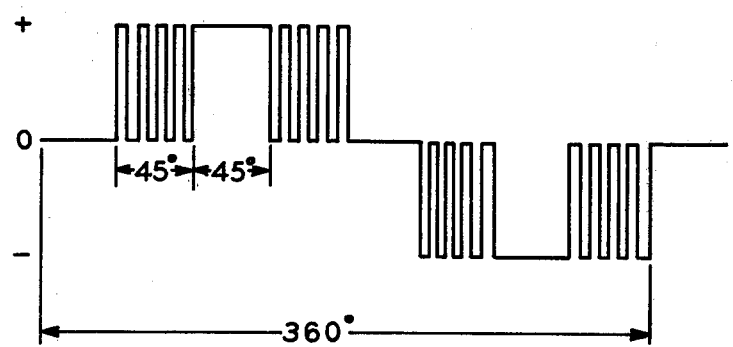
FIG. 9a illustrates the winding current associated with the commutating circuit of FIG. 9.

In FIG. 9, the chopper 185 behaves much like a free running multivibrator and employs a pair of NAND gates 187 and 189 with a resistance-capacitance feedback network having a time constant to give the chopper 183 a repetition rate, for example, around 32 times the repetition rate of the FIG. 9a wave form. This chopper signal is combined with A, B and C signals in NAND gates such as 191 with those A, B and C signals functioning to subdivide the interval of the illustrated wave form into its eight subintervals and to hold the winding current full off during the approximate subintervals. NAND gates, such as 193, enable when on, for example, power switching transistors for the respective windings, as previously illustrated. The A, B and C signals are derived from a pair of concatenated or series connected operational amplifiers 195 and 197, which in turn drive a two stage counter 199 which may, for example, be a CD4013AE. The input to the counter which comprises the output of amplifier 197 also provides directly the C signal and by way of inverter or NAND gate 201 provides a not C signal. The output from amplifier 197 also enables a transistor 203 to charge and discharge capacitor 205 and cycle the output of amplifier 195, driving amplifier 197 alternately to its high and low states.

Representative component values or element identification for the circuits of FIGS. 2 and 9:

| Ref. No. | Component |
|---|---|
| 215 | 15V. zenerdiode |
| 41 | 100 ufd |
| 217 | 39 ohm 2W |
| 223 | 10 K ohms |
| 225 | 150 ohm |
| 35 | 2N5988 Heat sink mounted |
| 37 | 2N6258 Heat sink mounted |
| 31 | CD4001 AE |
| 33 | 2N4401 |
| 39 | A15 |
| 221 | 2000 ufd 300V. |
| 195, 197 | LM324 |
| 205 | .01 ufd |
| 231 | 100 K ohm |
| 233 | 10 K ohm |
| 235 | 100 K ohm |
| 219, 239 | 22K ohm |
| 241 | 10 K ohm |
| 199 | CD4013 AE |
| 243 | 220 pf |
| 251 | 10 meg. ohms |

The NAND gates in FIG. 9 are of a C MOS variety and include 4 type 4012 and 3 type 4011.

In FIG. 10, there is illustrated in cross section, the magnet rotor 10 of FIG. 1 having a permanent magnet north pole 13 and a permanent magnet south pole 14. A voltage pulse is applied to one armature winding 205 by briefly closing switch 207 to couple the battery 209 or other voltage source thereto. With the rotor in the position illustrated and assuming winding 205 creates a north pole in its vicinity, the rotor will move a short distance in the counterclockwise direction changing the flux in winding 211 due to the north pole created by magnet 13 moving in its vicinity and inducing a voltage in that winding 211 which may be sensed, for example, by galvanometer 213. Any pair of motor windings could be selected for test pulse application and induced voltage sensing and the polarity of that induced voltage will give an indication of rotor position. In some cases, the results of the test pulse method may be ambiguous, for example, if the proper rotor magnet is directly under the test pulse winding, no rotor motion will occur. The proper selection of a different winding and application of a second test pulse will resolve such ambiguities.

While the present invention has been described with respect to the preferred embodiment, numerous modifications will suggest themselves to those of ordinary skill in the art and accordingly the scope of the present invention is to be measured only by that of the appended claims.

What is claimed is:

1. The method of providing commutating signals for a brushless direct current motor having a stationary armature with a longitudinal axis, a plurality of stator windings disposed in the armature to produce magnetic fields in response to selective winding energization, and a permanent magnet rotor adapted to rotate about the longitudinal axis in response to magnetic fields established by the selective winding energization comprising sequentially repeating the steps of: energizing at least one of the plurality of stator windings; selecting an unenergized winding which is another one of the plurality of windings available for energization for causing rotational movement of the permanent magnet rotor; sampling the induced voltage across the selected unenergized winding during a sampling interval; integrating the induced voltage during the sampling interval for developing a voltage integral with the integrating being initiated from a preselected initial integral value; comparing the voltage integral to a predetermined reference voltage level which is indicative of a predetermined relative angular position of the permanent magnet rotor; and returning the voltage integral to the initial value whereby integration of induced voltage of another unenergized winding may be subsequently performed and energizing another winding when the voltage integral exceeds the reference voltage level thereby providing selective commutation of the motor windings independently of rotor speed and in accordance with the relative position of the permanent magnet rotor.

2. The method of claim 1 wherein the step of integrating is performed over a time interval shorter than the time during which the at least one winding is energized.

3. The method of claim 2 wherein the step of integrating is initiated a short time after the at least one winding is energized.

4. The method of claim 1 including the further steps of retaining a digital indication of the at least one winding being energized and changing that digital indication when the voltage integral exceeds the reference voltage.

5. A commutation circuit for a brushless direct current motor comprising a stationary armature having a longitudinal axis, a plurality of stator windings disposed on said armature to produce magnetic fields, a permanent magnet rotor adapted to rotate about said axis in response to magnetic field established by said armature, said commutation circuit comprising: counter means identifying an energized winding; means for sampling the induced voltage in a winding not currently energized; said means for sampling responsive to the counter means for selecting a winding not currently energized and for establishing a sampling interval; means for integrating having an integration mode and an initial state, and connected to the means for sampling for integrating the induced voltage during the sampling interval for developing a voltage integral; a comparator for comparing the voltage integral to a predetermined reference voltage level and providing an output signal when the voltage integral exceeds the reference voltage level thereby indicating that the permanent magnet rotor has reached a predetermined relative angular position; means responsive to the comparator output signal for returning the integrating means to its initial state thereby readying the integrating means for responding to induced voltage of another selected unenergized winging and for incrementing the counter means for identifying still another winding to be energized.

6. The commutation circuit of claim 5 wherein the counter means comprises a ring counter.

7. The commutation circuit of claim 5 wherein the means responsive to the comparator output signal includes a one-shot timer for resetting the means for integrating, and a differentiating circuit responsive to the one-shot timer for incrementing the counter means.

8. The commutation circuit of claim 5 wherein the means for sampling includes a plurality of electrically actuable switches each in series with a motor winding lead and responsive to the counter means to sample an induced voltage in a winding not then identified by the counter means as being energized.

9. The commutation circuit of claim 8 wherein the counter means enables the means for sampling the winding next to be energized.

10. A commutation circuit for a brushless direct current motor comprising a stationary armature having a longitudinal axis, a plurality of stator windings disposed on said armature to produce magnetic fields, a permanent magnet rotor adapted to rotate about said longitudinal axis in response to magnetic field established by said armature, said commutation circuit comprising: counter means identifying an energized winding; means for sampling the induced voltage in a winding not currently energized; said means for sampling responsive to the counter means for selecting a winding not currently energized and for establishing a sampling interval; means for integrating having an integration mode and an initial state, and connected to the means for sampling for integrating the induced voltage during the sampling interval for developing a voltage integral; a comparator for comparing the voltage integral to a predetermined reference voltage level and providing an output signal when the voltage integral exceeds the reference voltage level thereby indicating that the permanent magnet rotor has reached a predetermined relative angular position; means responsive to the comparator output signal for returning the integrating means to it initial state thereby readying the integrating means for responding to induced voltage of another selected unenergized winding and for incrementing the counter means thereby identifying still another winding to be energized; and power circuit means responsive to the counter means for deenergizing a winding and energizing another winding in response to the incrementing of the counter means and thereby commutating the windings at the predetermined relative angular position of the permanent magnet rotor regardless of the rotor speed in accordance with the value of the integral of the induced voltage in an unenergized winding which is indicative of the relative angular position of the permanent magnet rotor.

11. The commutation circuit of claim 10 wherein the means responsive to the comparator output signal includes a one-shot timer for resetting the means for integrating, and a differentiating circuit responsive to the one-shot timer for incrementing the counter means.

12. The commutation circuit of claim 10 wherein the means for sampling includes a plurality of electrically actuable switches each in series with a motor winding lead and responsive to the counter means to sample an induced voltage in a winding not then identified by the counter means as being energized.

13. The commutation circuit of claim 10 wherein said counter means is operably connected to cause operation of said power circuit means without being subjected to winding energization voltage.

* * * * *